United States Patent Office 3,291,811
Patented Dec. 13, 1966

3,291,811
CYCLOHEXANO[g]CHROMONES SUBSTITUTED IN 2-POSITION BY CARBOXYL OR CARBOXY-METHYL-AMINOCARBONYL
Arthur Hedley Wragg, Cranage, Middlewich, England, assignor to Benger Laboratories Limited, Cheshire, England
No Drawing. Filed Mar. 18, 1963, Ser. No. 266,036
Claims priority, application Great Britain, Mar. 30, 1962, 12,222/62
5 Claims. (Cl. 260—345.2)

The present invention relates to new chemical compounds.

It has been found that the new chromone derivatives as hereinafter defined possess special activity as inhibitors of the antigen-antibody reaction.

Accordingly the present invention is for the new chromone derivatives of the formula:

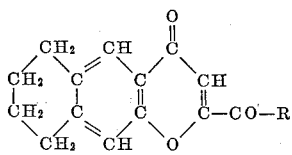

or salts or functional derivatives thereof, wherein the group R is hydroxy or the radical —NHR¹COOH, wherein R¹ is an alkylene radical, straight or branched chain (for example having from 1 to 4 carbon atoms such as methylene, ethylene or isopropylene).

Salts of the chromone derivatives which may be mentioned include metal (for example alkali metal) and ammonium salts of the carboxylic acid functions present.

The chromone derivatives of the invention have been shown in experimental anaphylaxis in animals to inhibit the release of spasmogens which normally follow the combination of specific antigen with antibody. In man, the pathological effects which follow the administration of antigen to susceptible subjects is markedly inhibited. These compounds are therefore also of value in the treatment of any condition in which an extrinsic antigene combination with antibody is primarily responsible for disease, for example asthma, hay fever, urticaria and the like.

Accordingly one embodiment of the invention is for a pharmaceutical composition which contains a chromone derivative as defined above or a salt or functional derivative thereof and a pharmaceutically acceptable carrier. The pharmaceutically acceptable carrier may be liquid and/or solid. The carrier may be for example suitable of the preparation of tablets or the like or suitable for the preparation of solutions for injection or suitable for the preparation of creams, lotions, pastes or the like.

In the case of compounds where the groups —X— are —CH₂—, these compounds may be prepared from 2-acetoxy - 5,6,7,8 - tetrahydronaphthalene (described by O'Farrell et al. J. Chem. Soc. 1955 p. 3986) by Fries rearrangement and by subsequent condensation of 2-acetyl-3-hydroxy - 5,6,7,8 - tetrahydronaphthalene with diethyl oxalate to give 2-(beta-ethoxycarbonyl-beta-oxypropionyl)-3-hydroxy-5,6,7,8-tetrahydronaphthalene, and cyclisation of 2-(beta-ethoxycarbonyl-beta-oxypropionyl)-3-hydroxy-5,6,7,8-tetrahydronaphthalene by refluxing with glacial acetic acid and hydrochloric acid, to give cyclohexano[g]chromone-2-carboxylic acid, which, if required, may be converted by conventional methods to the corresponding metal salts, ammonium salt, or simple esters.

The chromone derivatives in which R is a carboxyalkylamino group may be prepared by the treatment of a suitable reactive derivative of the acid of the formula:

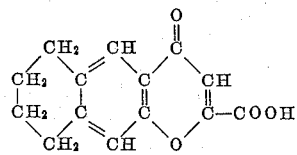

in organic solvent solution with the amino acid of the formula: $NH_2$—$R^1$—COOH, where $R^1$ has the significance indicated above, in the presence of a base.

Alternatively, the acid halide of the above chromone acid may be condensed with an ester of the amino acid and the resulting ester may be hydrolysed to the carboxylic acid, for example with hydrochloric acid in acetic acid.

The following examples are given to illustrate the present invention. All parts are by weight unless otherwise stated.

EXAMPLE 1

(a) *2-(beta-ethoxycarbonyl-beta-oxypropionyl)-3-hydroxy-5,6,7,8-tetrahydronaphthalene*

An ethanolic solution of sodium ethoxide prepared from sodium (16.2 g.) and ethanol (300 ml.) was stirred at 40° C., and to it was added a solution of 2-acetyl-3-hydroxy-5,6,7,8-tetrahydronaphthalene (28.5 g.) in diethyl oxalate (154 g.). This mixture was refluxed with stirring for 30 minutes whereupon a yellow solid separated. After cooling, water (500 ml.) and glacial acetic acid (70 ml.) were added, and the mixture was extracted three times with 150 ml. portions of chloroform. The combined extracts were washed with an excess of dilute sodium bicarbonate solution and then dried over anhydrous sodium sulphate. The chloroform was removed by heating on a water bath, and the residual diethyl oxalate was distilled off under vacuum. The remaining yellow oil solidified on cooling and was lixiviated from diethyl ether (40 ml.). Recrystallization from methanol gave 2-(beta-ethoxycarbonyl-beta-oxypropionyl) - 3 - hydroxy-5,6,7,8-tetrahydronaphthalene as a yellow solid; melting point 123–124° C.

Found: C, 67.3%; H, 6.1%. $C_{16}H_{18}O_5$ requires: C, 67.2%; H. 6.2%.

(b) *Cyclohexano[g]chromone-2-carboxylic acid*

2-(beta-ethoxycarbonyl-beta-oxypropionyl) - 3 - hydroxy-5,6,7,8-tetrahydronaphthalene (23.2 g.) was dissolved in a mixture of glacial acetic acid (165 ml.) and concentrated hydrochloric acid (33 ml.). The solution was then refluxed for 3½ hours. On cooling, water (50 ml.) was added, and the white solid produced was filtered off, washed with water (100 ml.) and dried at 100° C. to give 19 g. of crude product; melting point 267° C. (decomposition).

Recrystallization from glacial acetic acid, and then from dioxan gave cyclohexano[g]chromone-2-carboxylic acid (13 g.); melting point 274° C. (decomposition).

Found: C, 69.0%; H, 4.9%. $C_{14}H_{12}O_4$ requires: C, 68.9%; H, 4.9%.

EXAMPLE 2

6.1 parts of cyclohexano[g]chromone-2-carboxylic acid were dissolved in a mixture of 90 parts of dry toluene and 2.58 parts of triethylamine with slight warming. This solution was kept at −8° C. to −5° C. whilst 2.73 parts of ethyl chloroformate were added over 10 minutes. After the mixture had been left to stand at −5° C. for 38 minutes a solution of 1.93 parts of glycine in 25.5 parts of N sodium hydroxide solution, was added over about 3 minutes with vigorous stirring. After further stirring for 4 hours at room temperature, water and sodium carbonate solution were added to make the solution alkaline and to dissolve the solid present. The toluene layer was separated and discarded after washing with sodium carbonate solution. The combined carbonate solution was washed with ether, decolorised with charcoal, filtered and acidified to pH 1 with hydrochloric acid. 6.1 parts of crude 2 - carboxymethylaminocarbonylcyclohexano[g]-chromone were filtered off, melting point 238–243° C., washed with water and dried at 90° C. Recrystallization from acetic acid raised the melting point to 246–248° C.

*Analysis.*—Found: N, 4.75%. $C_{16}H_{15}NO_5$ requires: N, 4.65%.

The acid was converted into its sodium salt by suspending the acid in water, adding the theoretical amount of sodium hydroxide solution and freeze-drying the resulting solution to give a white powder.

EXAMPLE 3

A suspension of 24.4 parts of finely powdered cyclohexano[g]chromone-2-carboxylic acid in 125 parts of dry benzene, 0.75 part of dimethylformamide and 9.4 parts of thionyl chloride was stirred vigorously under dry nitrogen and refluxed until all the acid had just dissolved (this required about 45 minutes). The purple solution was evaporated to dryness in vacuo on the steam-bath. A further 50 parts of benzene were added and distilled off to remove excess of thionyl chloride. Care was taken to keep the apparatus filled with nitrogen when not evacuated. The remaining dark crystalline solid was dissolved in 200 parts of dry benzene and the solution was stirred under nitrogen. To the solution was added 25.8 parts of freshly prepared ethyl glycinate dropwise during 10 minutes. The temperature was kept down to about 30° C. A solid began to separate out during the addition. Stirring at room temperature was continued for a further 20 minutes and the mixture was left overnight at room temperature.

100 parts of water was then added and after stirring vigorously for 10 minutes the product was filtered off, washed with a little cold benzene and water and dried at 100° C. The ester had melting point 173–174° C. (29.3 parts, 89% of theory), and was a pale brick coloured solid. An analytical sample of melting point 173–174° C. was obtained by recrystallization from ethanol. (Found: N, 4.4%; $C_{18}H_{19}NO_5$ requires: N, 4.3%).

A solution of 28.25 parts of the above ester was dissolved in 550 parts of acetic acid and 55 parts of concentrated hydrochloric acid. The solution was refluxed for 30 minutes and left to cool overnight. The solid product was filtered off, washed with a little acetic acid and much water and dried at 100° C. 2-carboxymethylaminocarbonyl-cyclohexano[g]chromone crystallized as buff coloured plates; melting point 251–253° C. (33.75 parts, 85% of theory). The product was recrystallized with charcoaling from 750 parts of acetic acid in pale lemon-yellow coloured plates, of melting point 255–257° C. (29.2 parts, 74% of theory). (Found: N, 4.5%; $C_{16}H_{15}NO_5$ requires: N, 4.6%.)

EXAMPLE 4

The clinical evaluation of cyclohexano[g]chromone-2-carboxylic acid as the sodium salt (Compound A), and 2 - carboxymethylaminocarbonylcyclohexano[g]chromone as the sodium salt (Compound C), was based on the antigen inhalation provocation test. The human volunteers selected for test purposes suffered from specific allergic asthma. In these subjects an asthma attack normally followed the inhalation of an antigen to which they were specifically sensitive. The degree of asthma provoked by this method can be measured by repeated estimation of the increase of air way resistance.

A suitably designed spirometer was used to measure the forced expiratory volume at one second ($F.E.V._{1.0}$), hence the changes in air way resistance. The anti-allergic activity of a compound is estimated from the difference between the maximum percent $F.E.V._{1.0}$ reduction following control and test provocations after drug administration conducted under identical experimental conditions.

The results of tests are expressed as percent protection according to the formula:

$$\text{Percent protection} = 100 \times \left[ \frac{\text{Av. max. percent } F.E.V._{1.0} \text{ fall control shock} - \text{Max. percent } F.E.V._{1.0} \text{ fall test shock}}{\text{Av. max. percent } F.E.V._{1.0} \text{ fall control shock}} \right]$$

With this test procedure Compounds A and C when inhaled as a 0.5% aerosol (estimated dose inhaled=0.1 mg.) afforded approximately 70% protection when administered 10 minutes before the antigen. Antihistamines, such as for example mepyramine, afforded less than 10% protection under similar conditions or following maximal clinical dosage by oral or intramuscular routes.

I claim:
1. Cyclohexano[g]chromone-2-carboxylic acid.
2. 2 - carboxymethylaminocarbonylcyclohexano [ g ]-chromone.
3. Alkali metal salt of cyclohexano[g]chromone-2-carboxylic acid.
4. Alkali metal salt of 2-carboxymethylaminocarbonyl-cyclohexano[g]chromone.
5. Ammonium salt of cyclohexano[g]chromone-2-carboxylic acid.

References Cited by the Examiner

UNITED STATES PATENTS 3,000,891   9/1961   Janssen _____ 260—268

FOREIGN PATENTS 567,722    6/1958   Belgian.
980,302   12/1950   France.
C9856 NB  11/1956   Germany.

OTHER REFERENCES

Badger: Chemistry of Heterocyclic Compounds, 1961, p. 444.

Schmid et al.: Helvetica Chimica Acta, vol. 35, pp. 1990–1996 (1952).

Naylor et al.: Journal Chemical Society, London, pp. 1956–1958 (1960).

Noller: Chemistry of Organic Compounds, pp. 244–245, 2n ed. W. B. Saunders Co., Philadelphia (1957).

WALTER A. MODANCE, *Primary Examiner.*

NICHOLAS S. RIZZO, N. H. STEPNO, N. S. MILESTONE, *Assistant Examiners.*